United States Patent [19]

Robl

[11] Patent Number: 5,417,306
[45] Date of Patent: May 23, 1995

[54] TREE CLIMBING APPARATUS

[76] Inventor: William A. Robl, P.O. Box 314, Pickett, Wis. 54964

[21] Appl. No.: 72,334

[22] Filed: Jun. 3, 1993

[51] Int. Cl.$^6$ ............................................... A62B 9/00
[52] U.S. Cl. .................................... 182/134; 182/187; 182/221
[58] Field of Search ................................. 182/134–136, 182/187, 188, 9, 221

[56] References Cited

U.S. PATENT DOCUMENTS

| 857,430 | 6/1907 | Younquist | 182/134 |
| 3,028,929 | 4/1962 | Chubbs | 182/187 X |
| 4,316,526 | 2/1982 | Amacker . | |
| 4,331,216 | 5/1982 | Amacker . | |
| 5,249,644 | 10/1993 | Amacker | 182/134 |

FOREIGN PATENT DOCUMENTS

| 2327562 | 9/1977 | France | 182/134 |
| 853338 | 10/1952 | Germany | 182/120 |

OTHER PUBLICATIONS

Advertisement by Amacker ® International, "With our new Hook Stand, you're committed to success, not to a tree."

Primary Examiner—Alvin C. Chin-Shue
Attorney, Agent, or Firm—Conley, Rose & Tayon

[57] ABSTRACT

The improved climbing apparatus hereof includes a pair of climbing members attachable to the feet of a user that assist the user in climbing a tree or pole. When put to use, the climber maintains a motion similar to that used when climbing stairs to scale up or down the tree. Each climbing member includes a foot-supporting platform and a siderail attached to the foot-supporting platform that extends along the side of the tree. At least one adaptive member, such as a cam mechanism having a reciprocating arcuate portion, is attached to each climbing member. The cam mechanism changes its form or position depending upon an outer contour of the tree to thereby provide a gripping force against the tree. The climbing member thus advantageously grips tightly to the tree, thereby reducing the chances of slippage. In addition, since the tree climbing apparatus does not involve the use of teeth or spikes that wedge into the tree, the apparatus is environmentally "friendly" and trees are left undamaged.

6 Claims, 10 Drawing Sheets

TREE CLIMBING APPARATUS

BACKGROUND OF THE INVENTION

1. Field of the Invention

This invention relates to apparatus for climbing upright columnar members such as trees, poles and like. More particularly, this invention relates to tree climbing apparatus including a pair of climbing members that are attachable to the feet of a user.

2. Description of the Relevant Art

A variety of climbing apparatus are known that assist a person in climbing a tree or a pole. Hunters frequently use such apparatus to obtain an adequate elevation in a tree to thereby establish a perch where they wait for the passage of unsuspecting game below.

Exemplary tree climbing apparatus are disclosed in U.S. Pat. Nos. 4,316,526 and 4,331,216. Such tree climbing apparatus comprise an upper frame member and a lower frame member. The upper frame member includes a gripping means that engages against the side of the tree opposite the user and further includes a movable platform which is spaced from the tree to accommodate the body of the user in a sitting position. The lower frame member is similarly formed to support both feet of the user. By shifting his weight between the movable platforms, the user may alternately move the platforms until he reaches a desired elevation.

This type of tree climbing apparatus is typically relatively large in size and is thus relatively heavy and difficult to carry. Furthermore, when in use, this type of tree climbing apparatus may be blocked by limbs that extend from the trunk of the tree, thus limiting the elevation to which the user may attain and limiting the number of trees that may be climbed. Additionally, the gripping means of such apparatus typically include spike-like members or teeth that wedge into the sides of the tree. The tree thereby becomes damaged and scarred.

Another type of tree climbing apparatus includes a pair of climbing members that are attachable to the feet of a user. One exemplary apparatus of this type is known as "The Hook" stand, available from Amacker International of Delhi, La. Each climbing member includes a platform securable to one foot of the user and a bar or hook that extends behind the tree. Using this type of apparatus, the user can climb the tree using a motion similar to that employed when climbing stairs. The user may "step" over and around limbs that extend from the tree, thus allowing the user to climb to a higher elevation in the tree. This type of tree climbing apparatus is typically more compact and lighter than other commercially available tree climbing apparatus.

Unfortunately, tree climbing apparatus such as "The Hook" may be associated with several drawbacks. Such stands may be prone to losing their grip to the tree, thus posing a serious hazard. To alleviate this problem, some such apparatus include a set up teeth or spikes mounted to each foot platform that wedge into the tree. The tree thereby becomes scarred and damaged when the apparatus is used.

SUMMARY OF THE INVENTION

The problems outlined above are in large part solved by the improved climbing apparatus of the present invention. The improved climbing apparatus hereof includes a pair of climbing members attachable to the feet of a user that assist the user in climbing a tree or pole. When put to use, the climber maintains a motion similar to that used when climbing stairs to scale up or down the tree. Each climbing member includes a foot-supporting platform and a siderail attached to the foot-supporting platform that extends along the side of the tree. At least one adaptive member, such as a cam mechanism having a reciprocating arcuate portion, is attached to each climbing member. The cam mechanism changes its form or position depending upon an outer contour of the tree to thereby provide a gripping force against the tree. The climbing member thus advantageously grips tightly to the tree, thereby reducing the chances of slippage. In addition, since the tree climbing apparatus does not involve the use of teeth or spikes that wedge into the tree, the apparatus is environmentally "friendly" and trees are left undamaged.

An angle or a bend may be provided in the siderails of each climbing member to maintain a heal of each cam at a position against the tree that is approximately opposite the side of the tree that the user faces, even with changing tree diameter. The pressure points of the cams are thereby always upon the heel of the cam, allowing the cam to rotate and exert pressure on the tip of the cam. In addition, a locking device or other connecting means may be provided to lock the foot-supporting platforms together to thereby form a standing platform.

In accordance with one embodiment of the present invention, an apparatus for climbing an upright columnar member includes a right foot-supporting platform for accommodating a right foot of a user, a left foot-supporting platform for accommodating a left foot of the user, and a right and a left siderail attached to each respective platform for extending along each side of the upright columnar member. A first adaptive member, such as a cam mechanism, is attached to the right siderail, and second similar adaptive member is attached to the left siderail. Both the first and the second adaptive members change their form depending upon an outer contour of the columnar member to thereby grip the columnar member.

The present invention further contemplates an apparatus for climbing an upright columnar member comprising a right foot-supporting platform for accommodating a right foot of a user, and left foot-supporting platform for accommodating a left foot of a user. The apparatus further includes a first constricting member mechanically coupled to the right foot-supporting platform for gripping to the columnar member. The first constricting member includes at least one movable portion that changes its relative position with respect to the right foot-supporting platform depending upon an outer contour of the columnar member. A similar constricting member is connected to the left foot-supporting platform for gripping to the columnar member.

BRIEF DESCRIPTION OF THE DRAWINGS

Other objects and advantages of the invention will become apparent upon the following detailed description and upon reference to the accompanying drawings in which.

Figure 1:
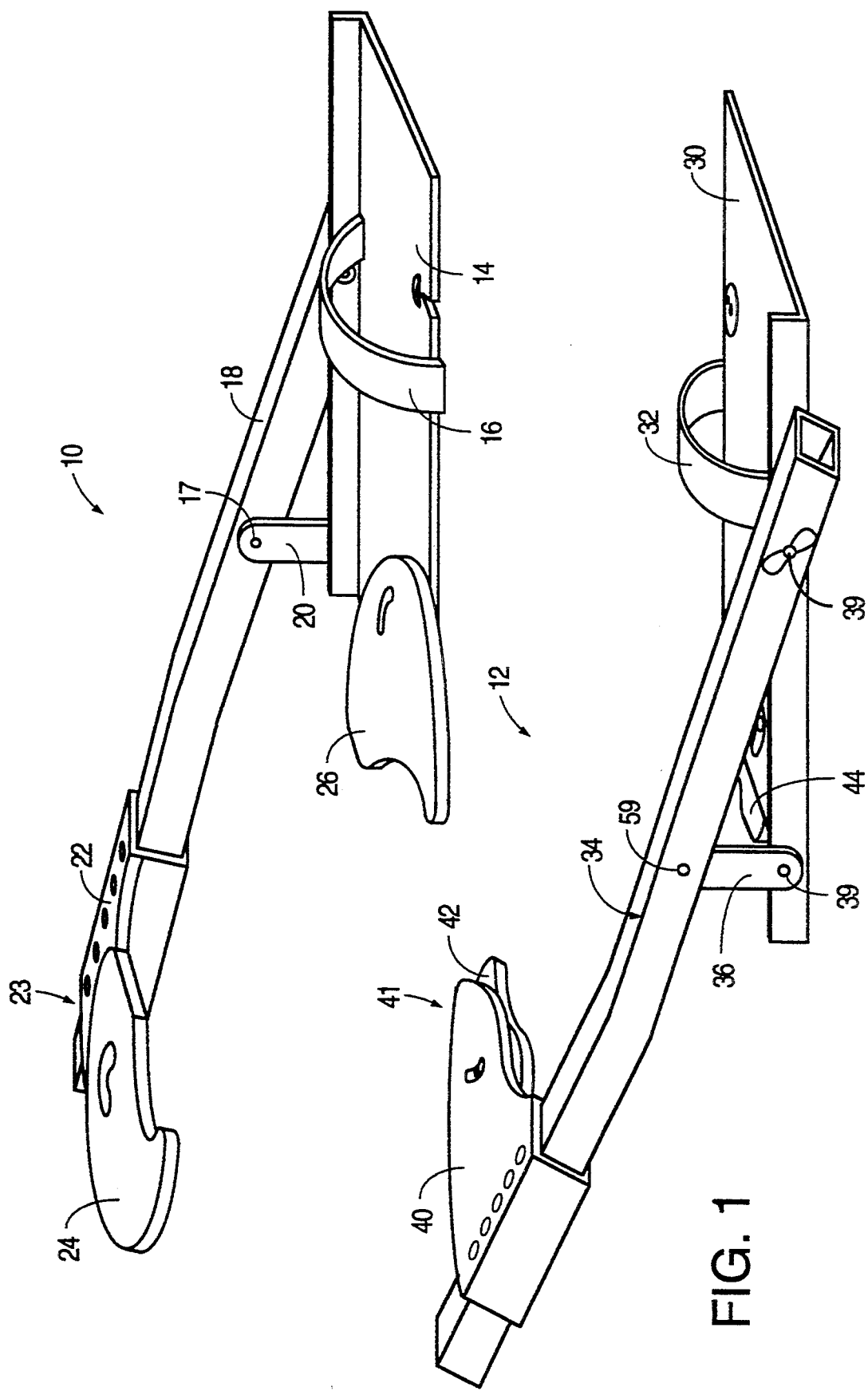
FIG. 1 is a perspective view of a tree climbing apparatus including a pair of climbing members in accordance with the invention.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Referring to FIG. 1, a perspective view is shown of a climbing apparatus including a pair of climbing members 10 and 12. As will become apparent from the description below, climbing member 10 is configured to accommodate the right foot of a user while climbing member 12 is configured to accommodate the left foot of the user.

Climbing member 10 includes a right foot-supporting platform 14 on which the user places his right foot and a foot strap 16 for securing the platform 14 to the user's right foot. The climbing member 10 further includes a right siderail 18 secured at one end to the platform 14 with a set of nuts and bolts 17 (and others not shown) and a brace 20. A right cam assembly 23 is positioned in the proximity of the other end of right siderail 18. The right cam assembly 23 includes a right cam bracket 22 and a first cam 24. A second cam 26 is also shown attached to the platform 14.

The component parts of the second climbing member 12 as shown in FIG. 1 are similar. Climbing member 12 includes a left foot-supporting platform 30 for accommodating the left foot of the user and a foot strap 32 for securing the platform 30 to the user's left foot. A left siderail 34 is secured at one end to platform 30 with a set of nuts and bolts 39 and a brace 36. A left cam assembly 41 is positioned in the proximity of the other end of left siderail 34. The left cam assembly 41 includes a left cam bracket 40 and a third cam 42. A fourth cam 44 is also shown attached to the platform 30. The operation of the climbing members 10 and 12 and further details of the cams 24, 26, 42 and 44 are discussed below.

Figure 2:
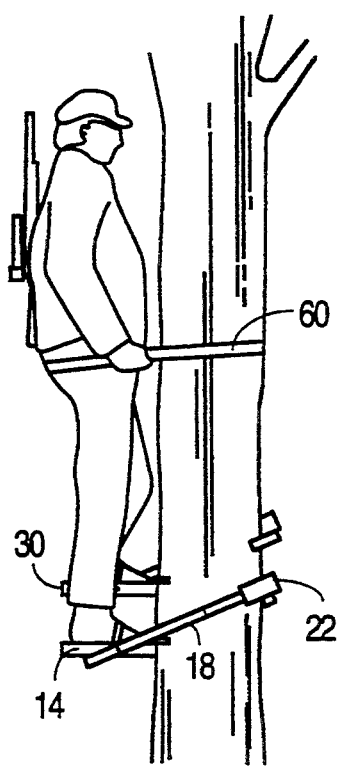
FIG. 2 is a perspective view of a person climbing a tree while using the tree climbing apparatus.

FIG. 2 is a perspective view of a hunter using a tree climbing apparatus in accordance with the present invention. By strapping each climbing member 10 and 12 to the respective foot, the person climbs the tree alternately lifting one leg and moving one climbing member at a time. This allows the person to step over or around limbs while climbing. For safety and assistance in balancing, the climbing apparatus is typically used in conjunction with a harness 60 that the person straps around the tree and around his upper body. The person moves the harness 60 as he is scaling up or down the tree. The harness 60 is typically provided with a buckle or other connecting means that allows the user to easily detach the harness 60 from around the tree to thereby pass by obstacles such as limbs.

Figure 3:
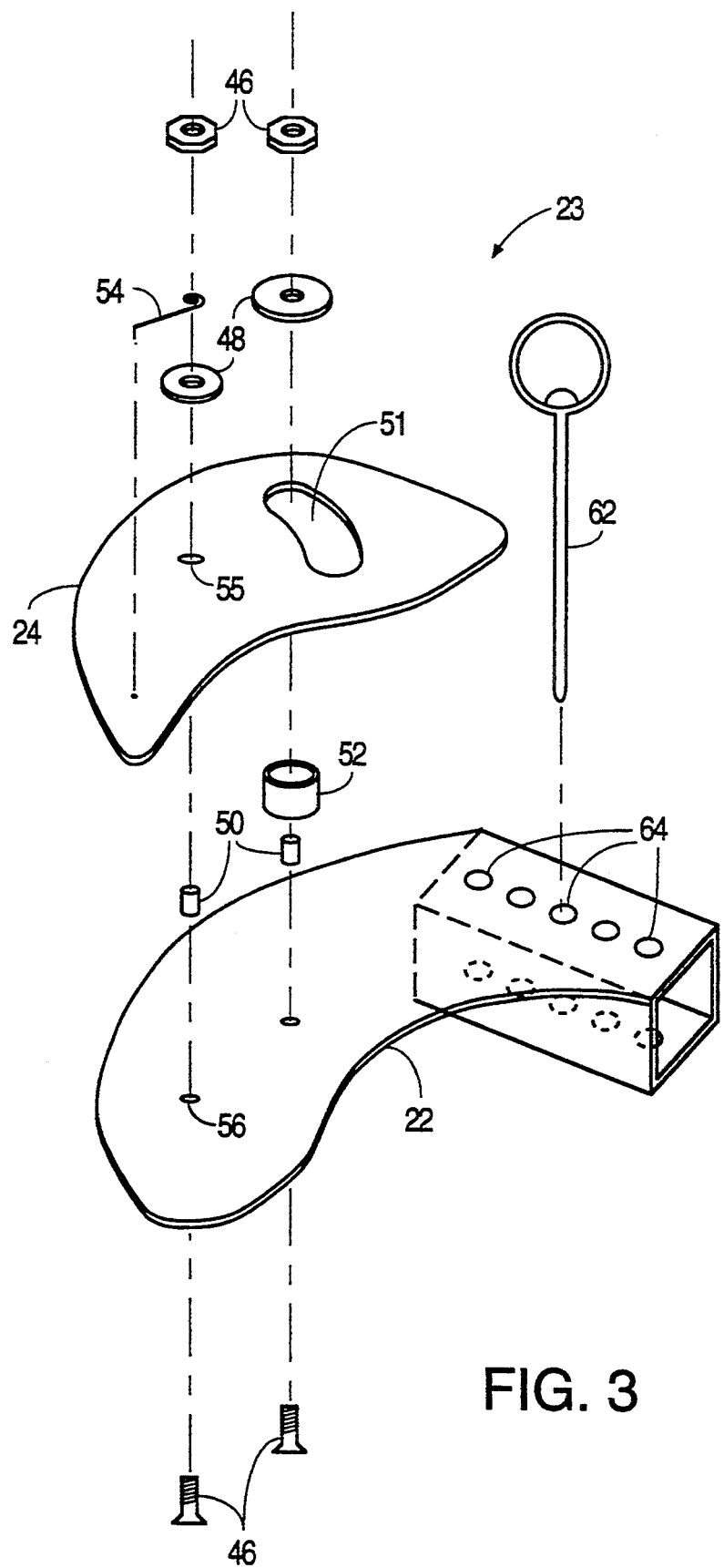
FIG. 3 is an exploded perspective view of a right cam assembly.

Referring next to FIG. 3, an exploded perspective view of the right cam assembly 23 is shown. Cam 24 is rotatably secured to cam bracket 22 using a set of nuts and bolts 46, washers 48, and spacers 50. A open groove 51 is provided within cam 24 to restrict the rotatable movement of cam 24 along a bushing 52. A spring 54 is further provided within the cam assembly 23 and is secured at a pivot point defined by holes 55 and 56. Spring 54 provides a force to position the cam 24 when external forces are not applied, which will be better understood from the following. A pin 62 is further provided and is accommodated by one of a plurality of holes 64. The holes 64 allow for the adjusting the position of the cam bracket 64 with respect to siderail 18.

Figure 4:
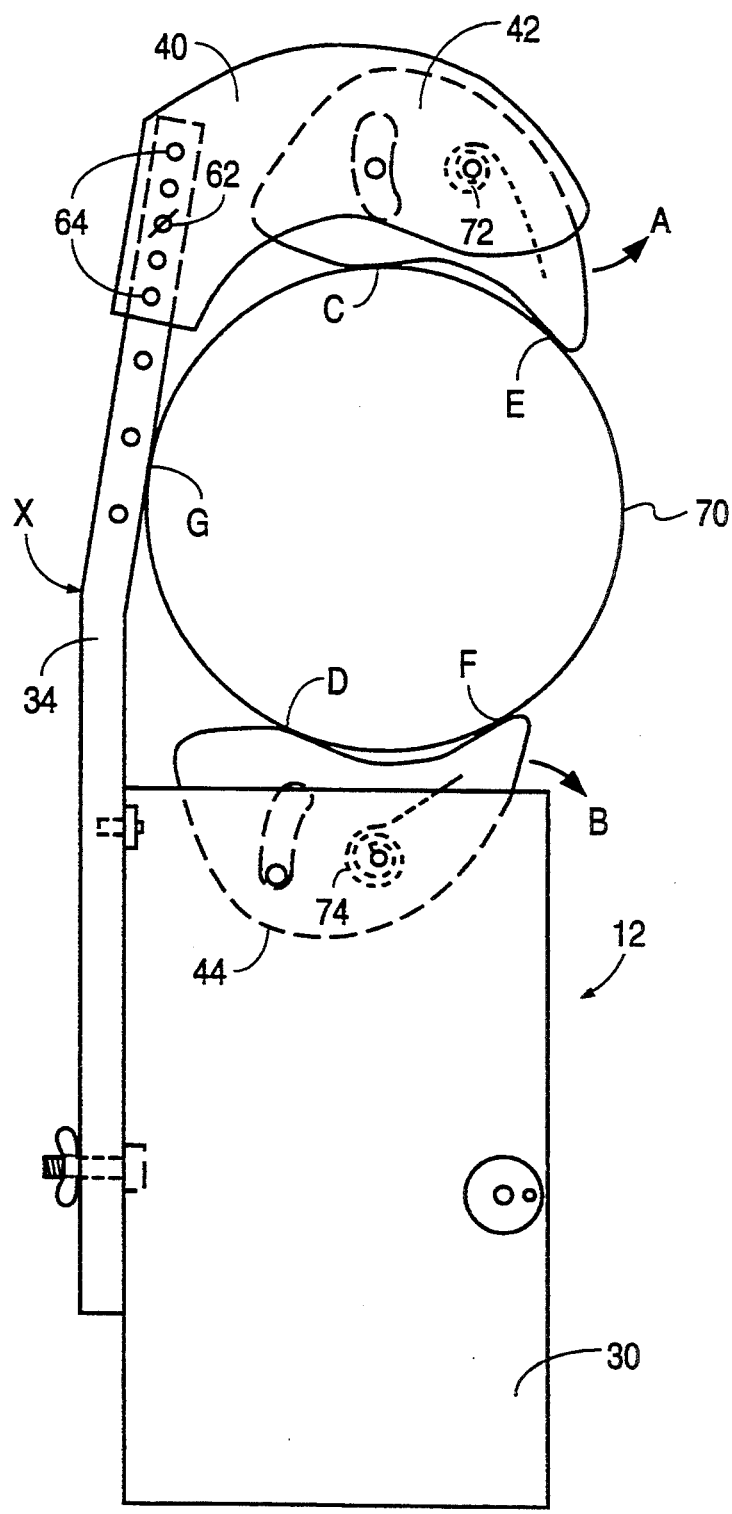
FIG. 4 is a top view of the left climbing member engaged with an upright columnar member.

The construction of the left cam assembly is similar as generally depicted in the top view of FIG. 4. FIG. 4 illustrates the climbing member 12 when engaged against the trunk 70 of a tree. Prior to climbing the tree, the user must first position the cam bracket 40 at an appropriate location with respect to the siderail 34 such that the opening between the cams 42 and 44 approximately matches the diameter of the trunk 70. This is accomplished by removing the pin 62 and sliding cam bracket 40 along siderail 34. The cam bracket 40 is then secured to the siderail 34 by inserting pin 62 within an appropriate hole 64. It is noted that when the climbing member 12 is not engaged against a tree, the springs 72 and 74 exert a force upon the cams 42 and 44 in directions A and B, respectively, such that the apparatus forms a claw-like opening.

When the climbing member 12 is positioned against the tree as shown in FIG. 4, the weight of platform 30 as well as the weight of the user causes pressure to be exerted upon "heal" portions of the cams 42 and 44 at points C and D, respectively. This causes the cam 42 to rotate in a direction opposite to direction A, and causes the cam 44 to rotate in a direction opposite to direction B. The claw-like structure formed by cams 42 and 44 thereby constricts and closes substantially, thus causing the "tip" portions of the cams 42 and 44 to tightly grip the climbing member 12 at points E and F. It is noted that, for a trunk of this diameter, the sidewall 34 contacts the trunk 70 at point G. It is further noted the cam assembly 41 as well as thee cam 44 are adaptive or constricting members that vary in position with respect to the platforms 14 and 30 depending upon an outer contour of the tree.

Figure 5:
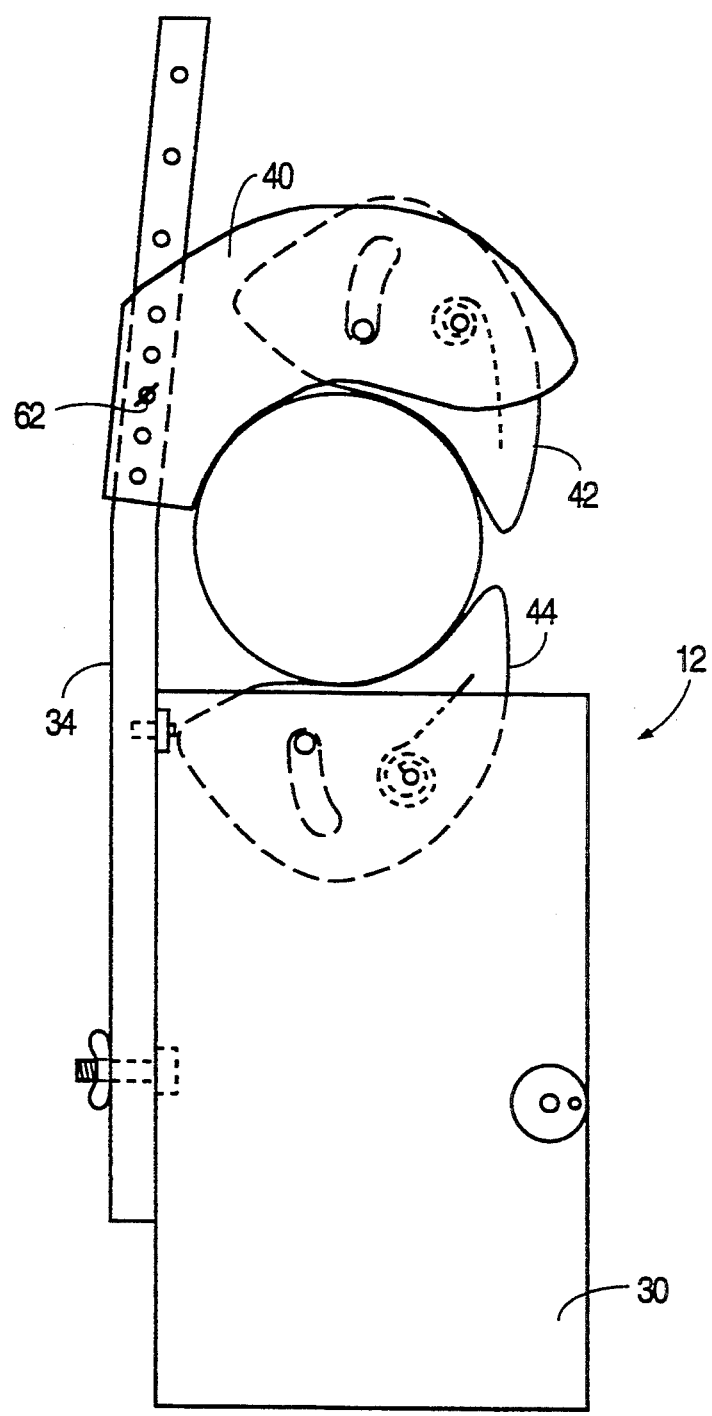
FIG. 5 is a top view of the left climbing member engaged with an upright columnar member having a smaller diameter.

FIG. 5 is a similar illustration of the climbing member 12 engaged against a tree. In this illustration, however, the diameter of the tree is substantially smaller. From a comparison of FIGS. 4 and 5, it is evident that the clawing and constricting characteristics of cams 42 and 44 again provide a tight grip around the trunk of the tree, and that cams 42 and 44 change their position in a constricting fashion to adaptively adjust to the diameter of the tree.

It is noted from FIGS. 4 and 5 that the left siderail 34 is provided with a bend at a point X. The bend at point X provides an angle to maintain the position of the heel of cam 42 at a point that is approximately directly opposite the side of the tree where the user stands. The pressure point is therefore always maintained at the heel of the cam, thus allowing it to rotate to exert pressure on the tip of the cam.

Figure 6:
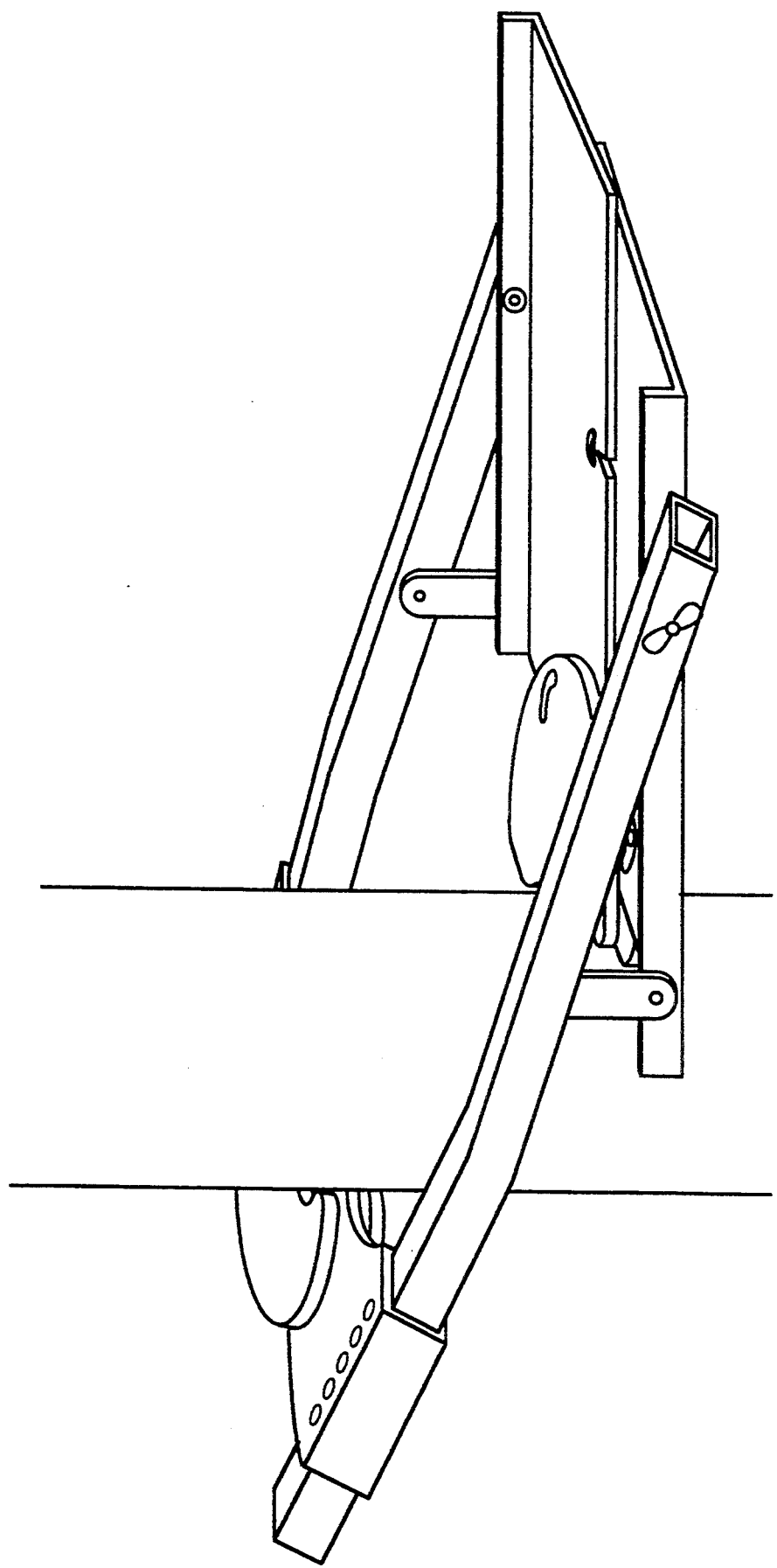
FIG. 6 is a perspective view of the two climbing members attached together to form a stand.
Figure 7:
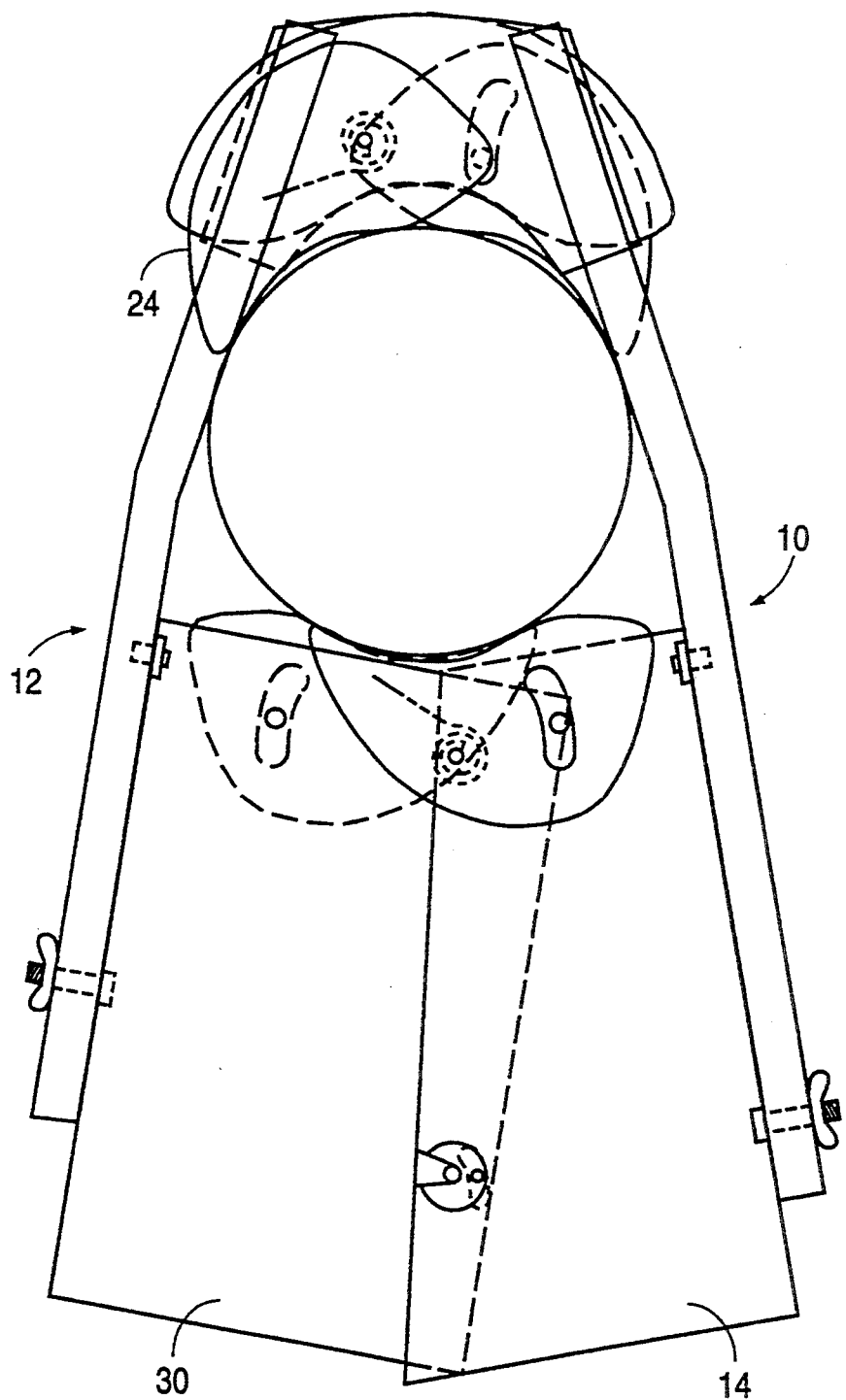
FIG. 7 is a top view of the climbing members attached together to form a stand.
Figure 8:
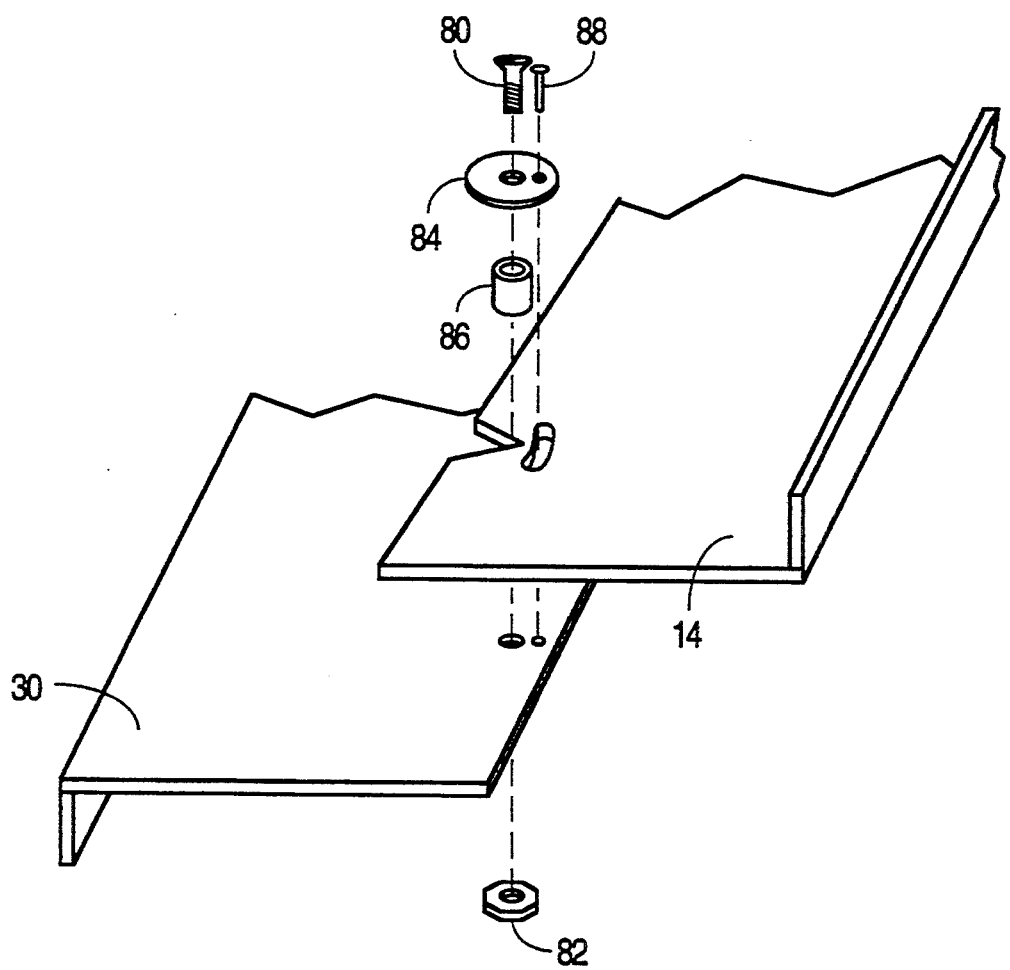
FIG. 8 is a perspective view that illustrates the attachment of the left foot-supporting platform to the right foot-supporting platform.

Once the user attains adequate elevation in a tree, he may desire to remain in the tree for a given time period. Accordingly, the climbing apparatus described above may further be provided with a connecting means for securing the right foot-supporting platform 14 to the left foot-supporting platform to thereby form a stand. FIGS. 6–8 illustrate the interconnectability of the two climbing members 10 and 12 to thereby form one such stand. As illustrated generally in the perspective view of FIG. 6, the climber must position the platforms 14 and 30 adjacent one another when he attains the desired elevation. Once adjacent, a locking device including a bolt 80, a nut 82, washer 84, spacer 86, and locking pin 88 may be employed. The washer 84 and spacer 86 are fixedly attached to the left foot-supporting platform 30 by bolt 80 and nut 82. When the climber attains the desired elevation and positions the platforms 14 and 30 adjacent one another in a lockable position, he inserts pin 88 into a hole of washer 84 and through respective holes of platform 14 and platform 30. The platforms 14 and 30 are thereby secure to one another.

As illustrated in FIGS. 1 and 7, the cams 24 and 26 of climbing member 10 are mounted above the cam bracket 22 and the platform 14, respectively. On the other hand, the cams 42 and 44 of the climbing member 12 are mounted beneath the cam bracket 40 and platform 30, respectively. It is apparent from FIG. 7 that such positioning allows the platforms 14 and 30 to be positioned adjacent one another in an overlapping fashion. Of course, the design of the platforms 14 and 30 as well as the attachment of the foot straps 16 and 32 must be sized and positioned to accommodate the overlying relationship that exists when the platforms 14 and 30 are connected.

Figure 9:
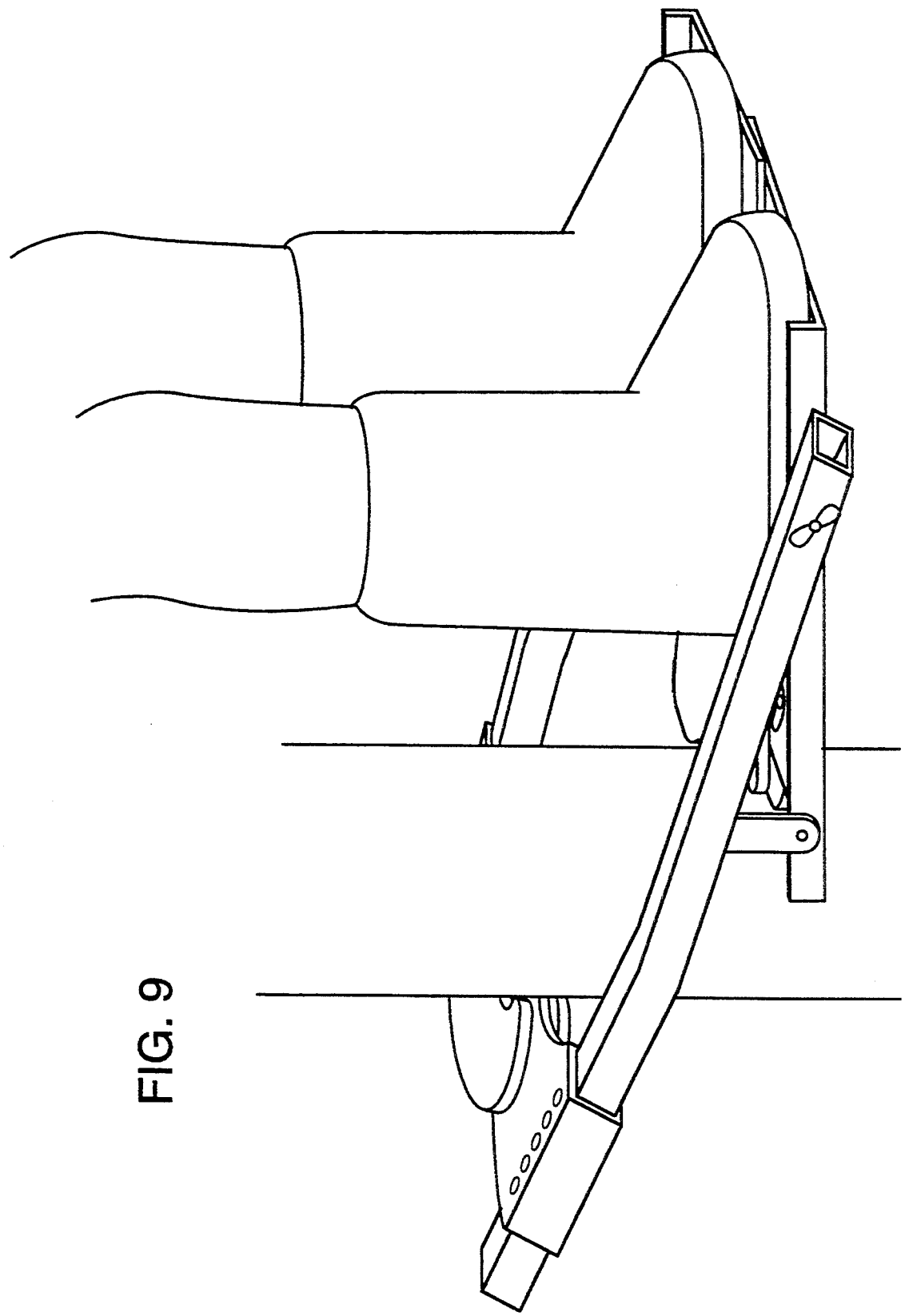
FIGS. 9 and 10 are perspective views of a person using the tree climbing apparatus as a tree stand.
Figure 10:
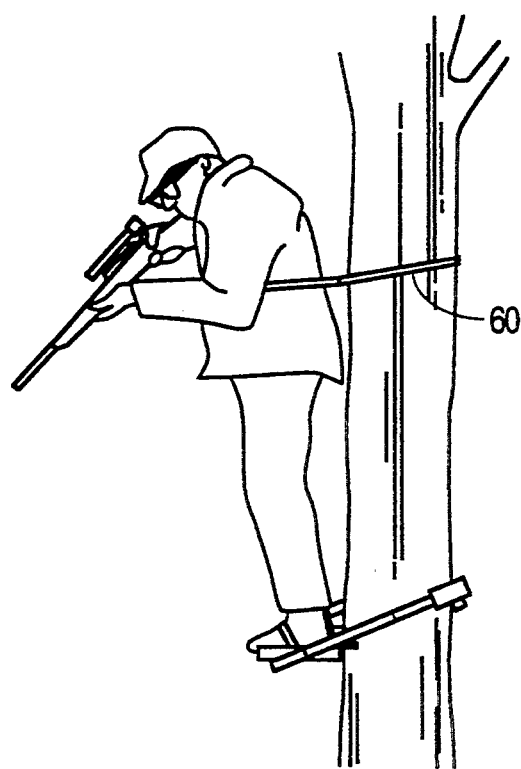

As depicted generally in the perspective views of FIGS. 9 and 10, once the climber has locked the climbing members 10 and 12 together, he may turn around upon the platforms 14 and 30 using the safety harness 60 for support. In the case of a hunter, the person may wait until unexpecting game pass below.

In view of the above description, it will be apparent to those skilled in the art that various modifications and changes may be made without departing from the spirit and scope of the invention as set forth in the claims. Although the cam mechanisms of each climbing member described above constitute adaptive members that change their form depending upon an outer contour of the tree, other adaptive mechanisms may be provided in the form of clamps, clasps, or other claw-like mechanisms. Furthermore, other adaptive members that change their position to thereby constrict the trunk of the tree may be employed. It is intended that the following claims be interpreted to embrace all such modifications and changes.

What is claimed is:

1. An apparatus for climbing an upright columnar member comprising:
    a right foot-supporting platform for accommodating a right-foot of a user;
    a first foot-strap connected to said right-foot supporting platform for securing said right-foot of said user to said right-foot supporting platform;
    a left foot-supporting platform for accommodating a left foot of the user;
    a second foot-strap connected to said left-foot supporting platform for securing said left-foot of said user to said left-foot supporting platform;
    a right siderail attached to said right foot-supporting platform for extending along a right side of said upright columnar member;
    a left siderail attached to said left foot-supporting platform for extending along a left side of said upright columnar member;
    a first adaptive member attached to said right siderail for contacting against said columnar member, wherein said first adaptive member changes its form depending upon an outer contour of said columnar member, and wherein said first adaptive member comprises a first cam assembly including a first cam bracket and a first cam pivotally mounted to said first cam bracket; and
    a second adaptive member attached to said left siderail for contacting against said upright columnar member, wherein said second adaptive member changes its form depending upon the outer contour of said columnar member, and wherein said second adaptive member comprises a second cam assembly including a second cam bracket and a second cam pivotally mounted to said second cam bracket.

2. The apparatus for climbing an upright columnar member as recited in claim 1 wherein said first cam assembly includes a reciprocating arcuate portion for contacting against said columnar member.

3. The apparatus for climbing an upright columnar member as recited in claim 1 wherein said first cam includes an arcuate portion for contacting against said upright columnar member.

4. The apparatus for climbing an upright columnar member as recited in claim 1 wherein a bend is provided in said right siderail.

5. The apparatus for climbing an upright columnar member as recited in claim 1 further comprising a locking device for connecting said right foot-supporting platform to said left foot-supporting platform to thereby form a standing platform.

6. The apparatus for climbing an upright columnar member as recited in claim 1 wherein said first adaptive member is a claw-like member for clamping against said columnar member.

* * * * *